March 27, 1934.  W. BELSHAW  1,952,355

CLUTCH DEVICE FOR DOUGHNUT MACHINES

Original Filed Oct. 21, 1930

INVENTOR
Walter Belshaw
BY J. L. Rivers,
ATTORNEY

Patented Mar. 27, 1934

1,952,355

UNITED STATES PATENT OFFICE 1,952,355

CLUTCH DEVICE FOR DOUGHNUT MACHINES

Walter Belshaw, Seattle, Wash.

Original application October 21, 1930, Serial No. 490,175. Divided and this application April 23, 1931, Serial No. 532,237

6 Claims. (Cl. 192—25)

My invention has reference to improvements in the type of doughnut machines for which Letters Patent of the United States, No. 1,738,033 were issued to me on December 3, 1929, wherein a pair of spaced and cam-actuated pistons operate in conjunction with a hopper and a cylinder connected thereto, and whereby, in cooperation with other instrumentalities, a raw doughnut may be formed and deposited in a separate receptacle for cooking.

This application relates particularly to pin clutch mechanism disclosed in my pending application, Serial No. 490,175, filed October 21, 1930, for improvements in Doughnut machines, and of which this is a divisional application. The parent application, above referred to, on May 19th, 1931, ripened into Patent No. 1,806,326.

The objects of this invention, stated in a general way, are, to provide a clutch device through which the pistons of said machine may be started or stopped in predetermined positions relative to said cylinder; to afford in said device a clutch collar rotatable with the driving shaft of said machine, said collar carrying a clutch pin readily engageable with a gear wheel rotatable on said shift; to supply a cam operable in disengaging said pin from said wheel; to furnish latch mechanism for holding said cam inactive and for bringing it into operative position relative to said pin; and, to make available a brake for said collar to facilitate the stopping of said shaft at a fixed, definite point in its path of rotation.

In the accompanying drawing—

Figure 1:
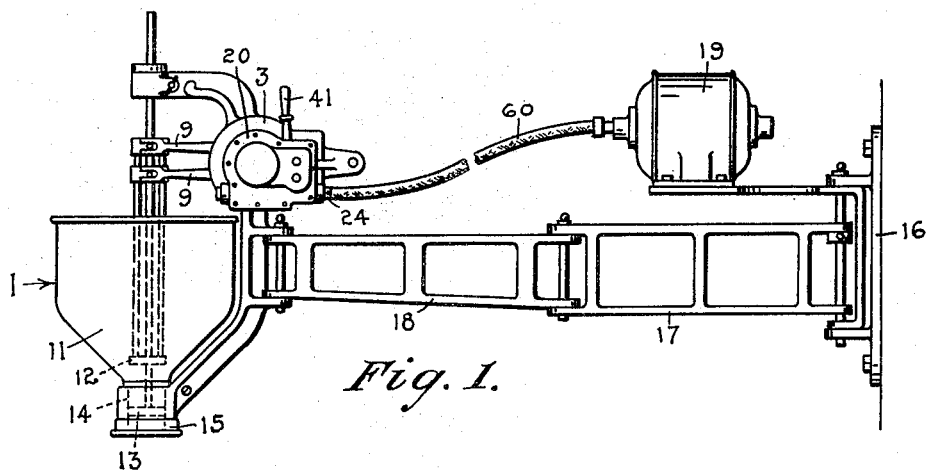
Figure 1 is a side elevation of the entire device, the same including a wall bracket carrying a seat for an electric motor, an electric motor installed thereon, a pair of arms extending from said bracket, said doughnut machine carried by said arms, and driving mechanism connecting said motor and said machine, including a flexible shaft broken away.
Figure 3:
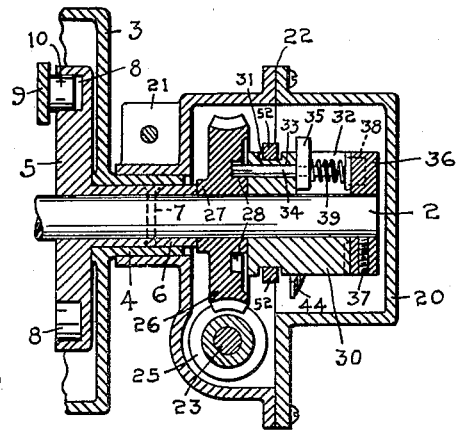
Fig. 3 is a vertical section drawn on the line 3—3, of Fig. 2, showing said gearing and other details of said clutch device, the view indicating said driving shaft as broken away and certain other parts of said doughnut machine, including a portion of a cam casing carrying a sleeve, a cam, and a cam lever connected with said cam.
Figure 4:
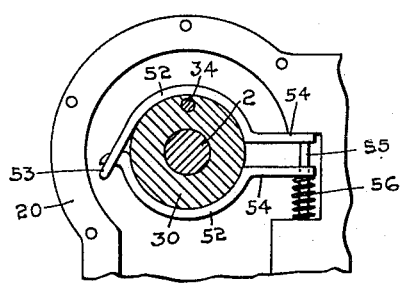
Fig. 4 illustrates in cross section a clutch collar mounted on said driving shaft, a portion of the enclosing casing being included, and said brake operative on the collar for slowing up said shaft as the power is cut off.

Referring more particularly to the drawings, 1 denotes generally said doughnut machine, certain parts of which obviously are connected to or particularly associated with the present device. Said parts comprise a driving shaft 2, a cam casing 3 carrying a sleeve 4, and a cam 5 provided on one side of its body portion with an integral and eccentrically disposed sleeve 6, said cam being mounted in said casing and on said shaft, the sleeve 6 being fixedly secured to said shaft by the pin 7 and rotatable in the sleeve 4. Said cam is also provided with a groove 8 and a cam lever 9 having at one end a roller 10 operative in said groove. Said cam and lever connected therewith are indicated in Fig. 3 and are illustrative of a pair of cams and levers mounted in said casing and which control piston means associated mainly with the hopper 11, said means including an upper piston 12, a lower piston 13, and a piston cylinder 14 at the lower end of said hopper, as shown by dotted lines in Fig. 1. Said pistons as they cooperate with said cylinder in forming and depositing a raw doughnut from dough placed within the hopper differ in their range of movement, the upper piston being adapted to travel in said hopper and cylinder and the lower piston being operative within said cylinder and below the outer terminal thereof. 15 denotes a flared guard member designed to protect said cylinder when the machine is moved about. A wall bracket 16 supports said machine through a pair of arms 17 and 18 swingingly connected together and swingingly secured to said bracket and machine, and also supports a motor 19 swingingly mounted thereto.

Said reduction gearing and the clutch device are designed to be mounted on the shaft 2 of the doughnut machine in place of the crank and handle provided in the hand-operated machine disclosed in said patent.

A casing 20 for enclosing said reduction gearing and clutch device is secured to the sleeve 4 by a clamp 21 integral with said casing and adapted to embrace said sleeve, said casing being in two sections secured together, as at 22. A shaft 23, designed to be driven by said motor, is journaled in the casing, said shaft being provided with an outwardly extending notched end 24. 25 denotes a worm mounted on said shaft and rotatable therewith.

A worm wheel 26, mounted on the shaft 2 and rotatable thereon, is adapted to mesh with said worm and is provided on one side with a shoulder 27 which bears on the sleeve 6 and on the other side with a pair of oppositely disposed openings 28 adapted to accommodate the clutch pin of said clutch.

Said gearing, interposed as it is between the driving shaft 23, which takes the speed of the driving shaft of the motor as will more fully appear, and the shaft 2, which transfers the power of the motor to the doughnut machine, is designed to be of such a character so as to reduce said speed, as desired, and transmit to said shaft 2 a power which will best meet the requirements of said machine.

Said clutch device comprises a clutch collar 30 mounted on said shaft 2 and rotatable therewith, the same being more particularly shown in Fig. 3. The collar carries adjacent its inner end a circumferential groove 31 for holding a brake band, and is provided with a slot 32 extending from the outer end of said collar for about half the length thereof and communicating with the central bore provided for said shaft, and 33 a bore extending from said slot and terminating at the inner end of said collar. A clutch pin 34, having fixedly secured thereto and adjacent one of its ends a right angular lug 35, is slidably mounted in the bore 33, said lug slidably engaging the slot 32 and projecting laterally from said collar. 36 designates a cap for said collar, the same being mounted on the shaft 2 and also rotatable therewith, said cap being secured to said shaft by the set screw 37 and keyed to said collar, or detachably secured to the collar in any other suitable way. Said cap is provided with a recess 38 adapted to house one end of a spiral spring 39, the other end of said spring being mounted on an end of said pin 34, the spring, as is evident, affording tension for said pin and lug. This clutch pin is designed to work on the worm wheel 26 and when operatively connected therewith engages one of the openings 28 therein and the lug 35 then occupies the position at the inner and closed end of the slot 32, as shown in Fig. 3.

Figure 2:
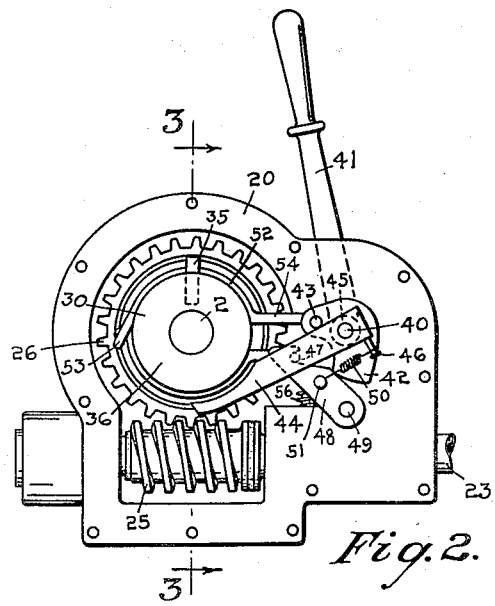
Fig. 2 is a side elevation of certain speed-reduction gearing disposed between the motor and said machine with a section of the casing therefor removed, the driven shaft for actuating the same being shown as broken away, said view also particularly showing said clutch device and including the driving shaft of said doughnut machine.

A shaft 40, journaled in the casing 20, carries at its outer end a handle 41 clampingly secured in place and operative exteriorly of said casing, and at its inner end and interiorly of the casing a cam 42, fixedly secured thereto and having a laterally extending pin 43. Said pin serves to limit the upward movement of a cam member 44 which is pivotally connected with the shaft 40 and spaced from the cam 42 by the washer 45. The cam member 44, as may be seen in Fig. 2, is made conformable to the outer surface of the cylindrical clutch collar 30, and said cam member when in operative position is designed to hug said collar. 46 denotes a pin extending from the cam member 44 in approximately the same plane thereof and 47 another pin projecting laterally from the underside thereof. A hooked trigger bar 48 is pivotally connected with the casing by the pin 49, said trigger bar being placed under tension by the spring 50 secured to said pin 46 and a pin 51 extending from said bar, the hook of said bar being adapted to engage the pin 47. The mechanism just described is for applying and releasing the clutch pin to and from said worm wheel, effective when power is applied to the device, and its mode of operation will be described in order.

A brake of the band variety is provided for the clutch collar, the same consisting of a pair of members each having a semicircular band portion 52 disposed in the groove 31 so as to embrace said collar and interlocked by their reversely curved ends, as at 53. Each of said members is also provided with a right angular arm 54, mounted for sliding movement on a rod 55 fixedly secured to the casing 20, one of said arms abutting against said casing, and the other arm having a spiral spring 56 disposed between it and said casing, the spring being mounted on said rod and obviously affording tension for said members.

Power is applied to the device by connecting the shaft 23 with said motor, the connection being effected by the flexible shaft 60 coupled to said motor and the shaft 23, through its notched end 24.

Assuming that the doughnut machine has been put in condition for forming raw doughnuts and suspended over a cooking receptacle by the supporting elements described, power from said motor is then applied, the same driving the shaft 23, which turns the worm 25, and the worm wheel 26 now rotatable on the shaft 2. To cause said power to be transmitted to shaft 2 of said machine, through said worm and wheel, the clutch device is now applied. This is effected by moving the handle 41 to the left and imparting motion to the shaft 40 and the cam 42 secured to said shaft, the pin 43, projecting from said cam and bearing against the upper edge of the cam member 44, then forcing said cam member away from the clutch collar 30, as indicated in Fig. 2, thereby affording clearance for the lug 35 and permitting the clutch pin 34 to slip into and engage one of the openings 28 in the worm wheel 26 as said wheel rotates. By providing a pair of said openings in the worm wheel, as is done, the connection of the clutch pin with said wheel, as is evident, may be more quickly accomplished. Said clutch collar being rotatable with the shaft 2 and now being secured to said worm wheel, it is obvious that motion conveyed to the worm wheel by the worm 25 will be transmitted to said shaft for running said doughnut machine.

To release the clutch, the handle 41 is moved to the right. The cam 42, operating on the upper edge of the hooked trigger bar 48, forces said bar out of engagement with the pin 47 in the cam member 44, thereby causing said member, under tension as it is by the spring 50, to snap into engagement with said clutch collar, said member now occupying a position against said collar. As the worm wheel 26 rotates the lug 35 comes in contact with the face of said cam member and rides thereon, said cam member then forcing the lug along its slot 32 and serving to withdraw the clutch pin 34, connected with said lug, from its engagement with said worm wheel.

As it may be noted, when said handle is moved as last described, the release of the clutch pin is effected automatically, the instrumentalities provided acting so as to withdraw said pin from the worm wheel at a fixed definite point in the path of rotation of the clutch collar.

The brake described is designed to have a strength sufficient to overcome any momentum attained by the clutch collar and the shaft 2 during the operation of the doughnut machine, consequently when the clutch is released, said clutch collar will stop at the point where the clutch pin leaves said worm wheel.

As set forth in detail in my said Patent No. 1,738,033, a pair of cams in said doughnut machine, and their connections, serve to impart the necessary movements to a pair of upper and lower pistons for forming raw doughnuts, the lower piston during the doughnut-forming operation extending outside of the piston cylinder for the purpose particularly of cutting off said doughnuts as formed. During the cutting operation, said lower piston is exposed, and should the machine be moved about at this particular time, said piston might be subjected to injury.

The lug 35 is placed in said clutch collar in a position relative to said cams of the doughnut machine, so that when the clutch is thus released said cams will be positioned at points whereby said lower piston will be retracted within the piston cylinder, permitting said machine to be moved from one cooking vat to another or otherwise handled without injury to said piston. As will be evident said lug will then occupy a predetermined position in company with the clutch pin.

Changes in and modifications of the construction described may be made without departing from the spirit of my invention or sacrificing its advantages, hence it is asked that I be not confined to the specific structure set forth, except as limited by the appended claims.

I claim:

1. In a doughnut machine having a driving shaft and a casing housing said shaft; a wheel rotatable on said shaft and having an opening, a cylindrical clutch collar rotatable with said shaft, a tensioned clutch pin having a laterally extending lug slidably mounted in said collar, said pin being engageable with said opening, a second shaft journaled in said casing and carrying a handle, a curved cam member pivotally connected with the second shaft and operable on said lug for disengaging the clutch pin from said opening, said member being provided with a laterally extending pin, a hooked and tensioned trigger bar pivotally connected with said casing and engageable with the last-named pin, a cam fixedly secured to the second shaft and engageable with said member, said last-named cam being adapted to release said bar and permit said member to engage said collar in operative position relative to said lug, and a pin projecting from the last-named cam for forcing said member away from said collar and into an inoperative position relative to said lug.

2. In a doughnut machine having a driving shaft; a wheel rotatable on said shaft and having an opening, a cylindrical clutch collar rotatable with said shaft, a drag brake for said collar, a clutch pin having a laterally extending lug slidably mounted in said collar, said pin being engageable with said opening, a tension element for said pin and lug, a curved cam member under tension and provided with a laterally extending pin, said member being operable on the periphery of said collar, a hooked trigger bar under tension and engageable with the last-named pin, and a hand-actuated cam engageable with said bar adapted to release said bar from said pin and whereby said curved cam member may be snapped into engagement with said collar, said lug being operative on the curved cam member, on rotation of said wheel, to disengage said clutch pin from said opening.

3. In a doughnut machine having a driving shaft; a casing housing said shaft, a wheel rotatable on said shaft, a socket for a clutch pin in said wheel, and mechanism enclosed in said casing, comprising a clutch collar having smooth wall portions and rotatable with said shaft, a drag brake embracing said collar, a clutch pin having a laterally extending lug slidably mounted in said collar and engageable with said socket, a tension element for said pin, a second shaft journaled in said casing, means for imparting a rotary movement to the second shaft, a curved cam member pivotally connected with the second shaft and engageable with said wall portions of said collar, said member being operable on said lug for disengaging the clutch pin from said socket, a pin extending laterally from said member, a trigger bar pivotally connected with said casing and engageable with said pin, a cam fixedly secured to the second shaft and engageable with said member, said last-named cam being adapted to release said bar and permit said member to engage said collar in operative position relative to said lug, and a pin projecting from the last-named cam for forcing said member away from said collar and into an inoperative position relative to said lug.

4. In a doughnut machine having a driving shaft and a wheel rotatable on said shaft and provided with an opening; a clutch collar rotatable with said shaft; a tensioned clutch pin slidably mounted in said collar and engageable with said opening; a lug extending from said pin, a second and rotatable shaft, manually turnable, a cam member pivotally connected with the second shaft and operable on said lug for disengaging the clutch pin from said opening, a pin extending laterally from said member, a pivoted trigger bar engageable with the last-named pin, a cam rotatable with the second shaft and engageable with said member, said last-named cam being adapted to release said bar and permit said member to engage said collar in operative position relative to said lug, and a pin extending from the last-named cam for forcing said member away from said collar and into an inoperative position relative to said lug.

5. In a doughnut machine having a driving shaft; a gear wheel rotatable on said shaft and provided with an opening for a clutch pin, a cylindrical clutch collar rotatable with said shaft, a clutch pin having a laterally extending lug slidably mounted in said collar, a tension spring for said pin, said pin being adapted to engage said opening on rotation of said wheel, a second shaft rotatably mounted, a cam member pivotally connected with the second shaft and engageable with the circumferential surface of said collar, said member being operable on said lug for withdrawing said pin from said opening on rotation of said wheel, a pin extending laterally from said member, and mechanism for bringing said member into and out of operative engagement with said collar, including a hooked and spring-controlled trigger bar engageable with the last-named pin and a hand-actuated cam operative on said bar.

6. In a doughnut machine having a driving shaft; a clutch, comprising a gear wheel rotatable on said shaft and having a socket for a clutch pin, a cylindrical member rotatable with said shaft, a clutch pin mounted in said member and engageable with said socket, said pin providing, in cooperation with said member, an uninterrupted driving connection for the gear wheel with said shaft, a cam engageable with said member and operable on the circumferential surface thereof, a lug projecting laterally from said pin and engageable with said cam whereby said pin may be automatically and gradually withdrawn from said opening on rotation of said member, and mechanism for selectively bringing said cam into and out of operative engagement with said member, including a trigger-controlled detent and a hand-actuated cam.

WALTER BELSHAW.